(12) United States Patent
Son et al.

(45) Date of Patent: May 11, 2010

(10) Patent No.: US 7,716,701 B2

(54) APPARATUS AND METHOD FOR DISPLAYING EPG GUIDE BAR

(75) Inventors: Hyeong Ho Son, Seoul (KR); Ji Yeon Hwang, Seoul (KR); Eui Seung Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 1335 days.

(21) Appl. No.: 09/956,102

(22) Filed: Sep. 20, 2001

(65) Prior Publication Data

US 2002/0087983 A1    Jul. 4, 2002

(30) Foreign Application Priority Data

Dec. 29, 2000    (KR) ................. 2000-85554

(51) Int. Cl.
*H04N 5/445*    (2006.01)

(52) U.S. Cl. .......................... 725/39; 725/49

(58) Field of Classification Search ............ 725/39, 725/49
See application file for complete search history.

(56) References Cited

U.S. PATENT DOCUMENTS

| | | | | |
|---|---|---|---|---|
| 5,134,499 A * | 7/1992 | Sata et al. | ............ | 386/109 |
| 5,241,428 A * | 8/1993 | Goldwasser et al. | ........ | 386/109 |
| 5,422,675 A * | 6/1995 | Lim | ........ | 375/240.24 |
| 5,701,383 A * | 12/1997 | Russo et al. | ............ | 386/46 |
| 5,982,363 A * | 11/1999 | Naiff | ............ | 715/721 |
| 6,219,839 B1 * | 4/2001 | Sampsell | ............ | 725/40 |
| 6,414,686 B1 * | 7/2002 | Protheroe et al. | ............ | 345/474 |
| 6,642,939 B1 * | 11/2003 | Vallone et al. | ............ | 715/721 |
| 6,701,525 B1 * | 3/2004 | Neervoort et al. | ............ | 725/38 |
| 6,832,386 B1 * | 12/2004 | Jerding et al. | ............ | 725/39 |
| 7,272,298 B1 * | 9/2007 | Lang et al. | ............ | 386/83 |
| 2002/0040476 A1 * | 4/2002 | Whitehead | ............ | 725/39 |
| 2004/0045024 A1 * | 3/2004 | Marshall et al. | ............ | 725/39 |
| 2004/0226042 A1 * | 11/2004 | Ellis | ............ | 725/43 |
| 2005/0040973 A1 * | 2/2005 | Koto et al. | ............ | 341/50 |
| 2005/0125823 A1 * | 6/2005 | McCoy et al. | ............ | 725/34 |
| 2005/0138656 A1 * | 6/2005 | Moore et al. | ............ | 725/45 |
| 2005/0149972 A1 * | 7/2005 | Knudson | ............ | 725/56 |

FOREIGN PATENT DOCUMENTS

| | | |
|---|---|---|
| EP | 1 014 715 A2 | 6/2000 |
| JP | 11-341371 A | 12/1999 |
| KR | 10-1999-0002937 A | 1/1999 |

\* cited by examiner

*Primary Examiner*—Christopher Kelley
*Assistant Examiner*—Franklin S Andramuno
(74) *Attorney, Agent, or Firm*—Birch, Stewart, Kolasch & Birch, LLP

(57) ABSTRACT

An apparatus for displaying an EPG guide bar includes: an EPG data extraction part extracting EPG data from a signal through a channel; a first memory storing the EPG data; a second memory storing a broadcast program; a user interface display part producing a guide bar having a fixed indicator displaying a present time with the help of a graphic processor, sliding title areas of broadcast programs corresponding to the EPG data of the first memory in the guide bar on real-time correspondingly to the present time, and updating the title areas with a predetermined time interval centering around the fixed indicator so as to produce information indicating a record proceeding status on at least one of the title areas of the broadcast programs which are being recorded in the second memory; and an on-screen display part converting the information from the user interface display part into an on-screen display form so as to display the converted information on a display.

22 Claims, 4 Drawing Sheets

APPARATUS AND METHOD FOR DISPLAYING EPG GUIDE BAR

BACKGROUND OF THE INVENTION

1. Field of the Invention

The present invention relates to an apparatus and method for displaying an EPG guide bar.

2. Background of the Related Art

Generally, the progression status of broadcasting a TV program is displayed as a time shifting bar or as a circular form such as a watch.

For instance, a horizontal bar is frequently used for a computer or a TV set. Such a bar can display a limited portion of a program on a screen, corresponding to one hour or half an hour.

FIG. 1 illustrates a diagram of a screen on which a time shifting bar is displayed according to a related art.

Referring to FIG. 1, such a bar generally has an indicator which depending on the progress of the program shifts from a left end where the program starts to a right end where the program ends. In other words, the indicator directs the progress extent of the current broadcasting program or the remaining extent of the program.

The bar displayed on the screen is tuned to the TV set to be used for indicating a record extent of the program on air. Generally, the TV set is equipped with a built-in memory enabling to record about one hour of broadcast program. Besides, the lengths of broadcast programs are different.

For instance, there may be a broadcast programs which lasts for half an hour, one hour, or the more.

In this case, the bar has an indicator indicating an record extent of the program as shown in FIG. 1. And, the indicator displays the progress of data recording in a memory having a capacity of one hour. In other words, the presently broadcasted program is continuously stored in the memory. When the broadcast program of one hour is completely stored in the memory having a capacity of one hour, the front parts of the contents stored in the memory are erased in order and, simultaneously, the contents of the program in progress are stored in the parts from which the previously-stored data are erased. In this case, the indicator moves slowly from the left end to the right end of the guide bar while the contents of the program in progress are stored in the memory. Namely, the indicator moves from left to right of the guide bar for an hour. After one hour, the indicator starts to move from right to left of the bar. Therefore, at least two broadcast programs may be stored in the memory entirely or in part. Instead, a single broadcast program may be stored in the memory entirely or in part.

However, in accordance with the above-explained related arts, the memory stores the contents of the programs broadcasted through one channel consecutively with an interval of one hour therein. And, the indicator of the bar indicates the data storage extent in the memory having a capacity of one hour. Hence, a viewer fails to check how far the presently broadcasted program is in progress as well as how much the memory is used for storing the data.

For instance, the viewer may leave the TV set temporarily for other purpose during watching a TV program. In this case, the viewer, who wishes to watch the missing part of the program, needs to know how far the program has run using the guide bar. If knowing how far the program that the viewer missed and how much the memory is used for recording the program, the viewer manipulates a key panel or a remote controller to keep up with the missing parts, i.e. time shifting to the starting point of the missing part stored in the memory. However, the guide bar and indicator of the guide bar fail to indicate the exact location of the missing part. This is because the indicator does not indicate the running extent of the presently broadcasted program but the storage extent of the memory.

Meanwhile, in the guide bar according to the related art shown in FIG. 1, the indicator moves within the guide bar having a fixed area. Such a technology, which is generally used for a scale or a speedometer of a car, fails to be applied to the case that the length of the program exeeds the maximum range of the scale.

For another instance, the TV broadcast programs have different lengths. It is substantially impossible to indicate the starting and ending points of the respective programs while carrying out recording/erasing such progras in/from the memory having the capacity of one hour. In other words, when a program of at least one hour is recorded, the guide bar having a length equivalent to the capacity of the one-hour memory is supposed to be located at the right end of the guide bar. Therefore, in order to indicate that the program has been recorded for at least an hour, another bar is necessary to show up on the screen.

SUMMARY OF THE INVENTION

Accordingly, the present invention is directed to an apparatus and method for displaying an EPG guide bar that substantially obviates one or more problems due to limitations and disadvantages of the related art.

An object of the present invention is to provide an apparatus and method for displaying an EPG guide bar enabling to erase the presently-broadcast programs updated by a predetermined time interval using the present time as a reference as well as display a recording status on a screen graphically.

Another object of the present invention is to provide an apparatus and method for displaying an EPG guide bar enabling to shift a broadcast program being watched by a viewer temporally back to the viewer-demanding previous temporal location while the viewer watches the broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for displaying an EPG guide bar according to the present invention includes an EPG data extraction part extracting EPG data from a signal through a channel; a first memory storing the EPG data; a second memory storing a broadcast program; a user interface display part producing a guide bar having a fixed indicator displaying a present time with the help of a graphic processor, sliding title areas of broadcast programs corresponding to the EPG data of the first memory in the guide bar on real-time correspondingly to the present time, and updating the title areas with a predetermined time interval centering around the fixed indicator so as to produce information indicating a record proceeding status on at least one of the title areas of the broadcast programs which are being recorded in the second memory; and an on-screen display part converting the information from the user interface display part into an on-screen display form so as to display the converted information on a display.

In another aspect of the present invention, a method of displaying an EPG guide bar includes the steps of displaying a guide bar on a screen and a fixed indicator fixed to a predetermined position of the guide bar wherein the fixed bar represents a present time; displaying title areas of broadcast programs corresponding to EPG data on real-time by taking the fixed indicator as a reference wherein the title areas slide within the guide bar; recording/storing the broadcast programs corresponding to the sliding title areas in a manner that the broadcast programs corresponding to the sliding title areas are updated with a predetermined time interval by taking the fixed indicator as a reference; and displaying a record proceeding status on the title areas of the broadcast programs which are being recorded in the memory within the guide bar.

Preferably, the fixed indicator representing the present time is positioned at a center of the guide bar.

Preferably, each length of the title areas of the broadcast programs is proportional to a broadcast length of a real broadcast program.

Preferably, the shaded title area is different from the unshaded title areas in color.

Accordingly, considering the presently-broadcast program, the viewer enables to be informed of the progress extent and the recorded amount of the presently-broadcast program using the present time represented by the fixed indicator as time goes on. Namely, the viewer enables to attain information about a time interval in which the progress location of the viewer-demanding broadcast program enables to be shifted to the previous temporal location.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
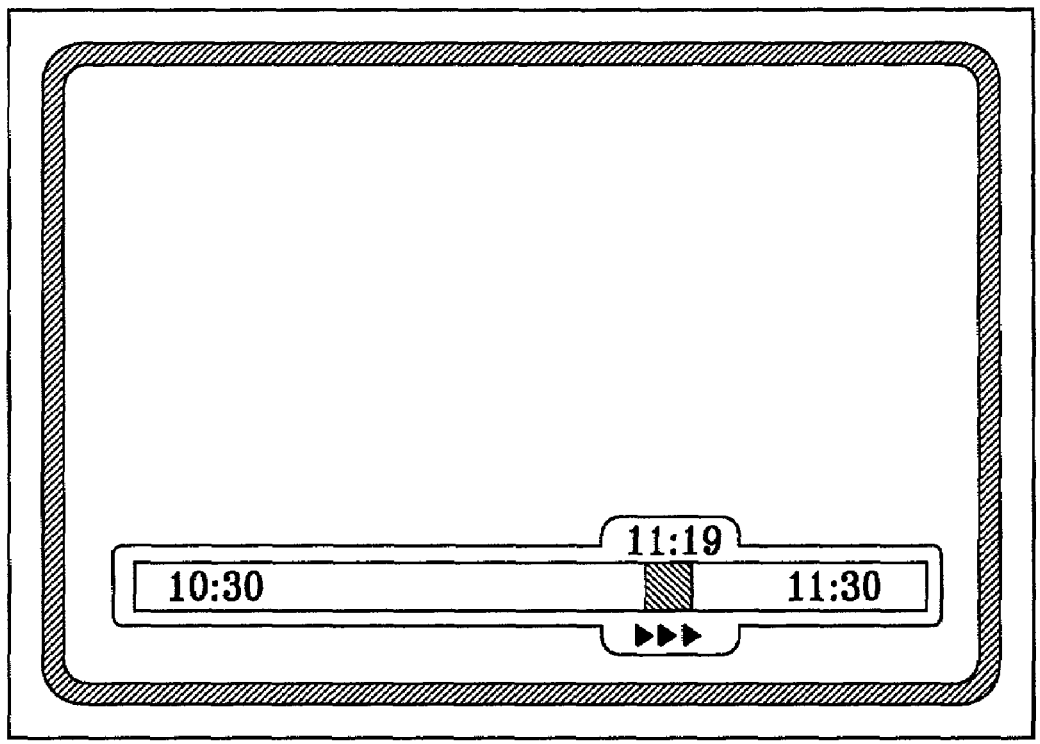
FIG. 1 illustrates a diagram of a screen on which a time shifting bar is displayed according to a related art.
Figure 2:
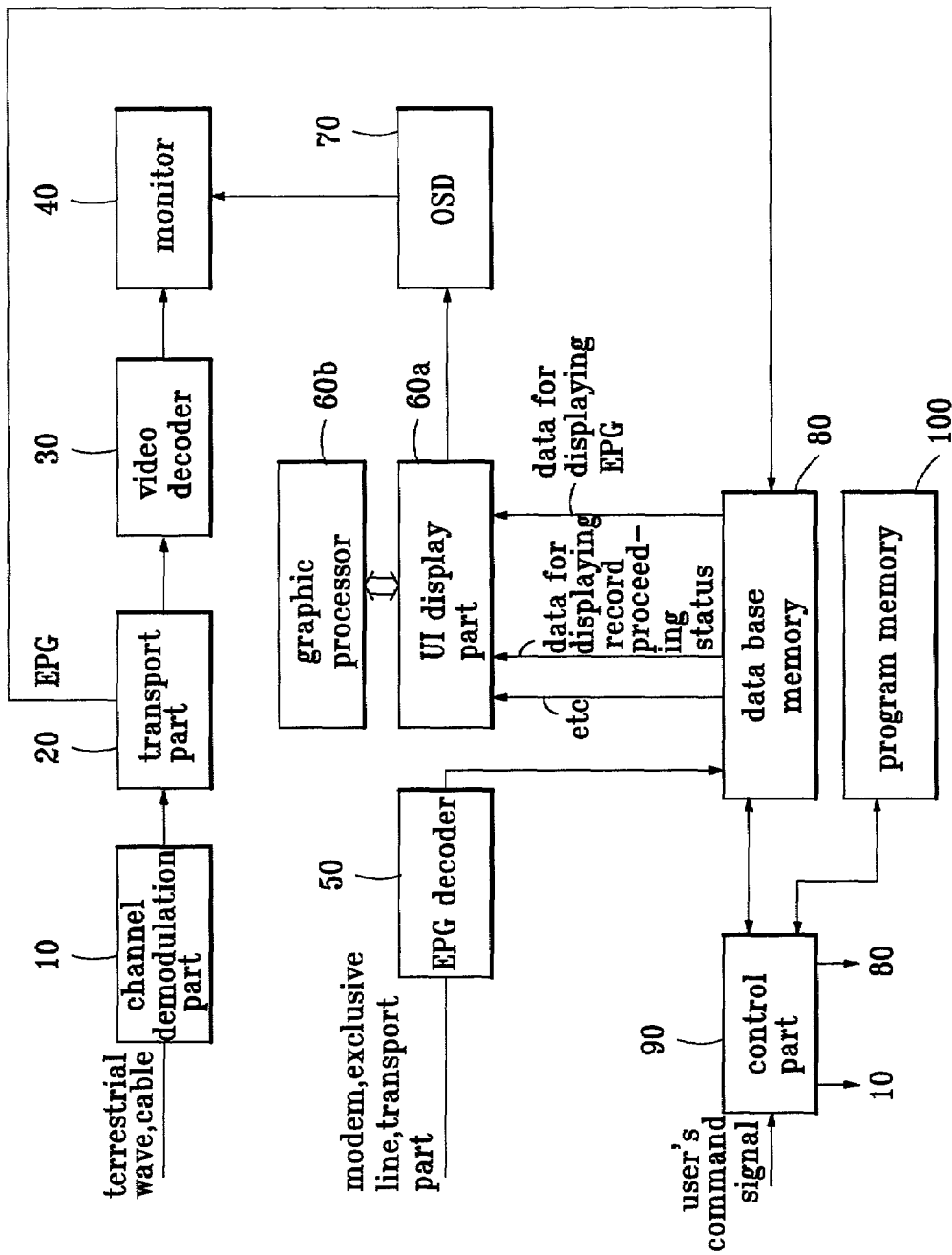
FIG. 2 illustrates a block diagram of a schematic construction of an EPG guide bar according to the present invention.

FIG. 2 illustrates a block diagram of a schematic construction of an apparatus representing an EPG guide bar according to the present invention.

Referring to FIG. 2, the apparatus is constructed with a channel demodulation part 10, a transport part 20, a video decoder 30, a monitor 40, an EPG decoder 50, a UI (user interface) display part 60a, a graphic processor 60b, an OSD (on-screen display) part 70, a data base memory 80, a control part 90, and a memory 100.

The channel demodulation part 10, to which a broadcast signal including EPG information is inputted through a channel such as a terrestrial wave or a cable signal, removes a noise generated from the channel and then outputs the noise-removed signal.

The transport part 20 divides the signal outputted from the channel demodulation part 10 into data relating to the EPG information and a video signal respectively.

The video decoder 30 decodes the data relating to the video signal from the transport part 20 and then outputs the decoded signal to the monitor 40. The decoded video signal is displayed on the monitor 40.

Meanwhile, the EPG decoder 50, when receiving the EPG related signal from the transport part 20 and the data relating to a UI (user interface) including the EPG information through an additional channel such as a modem or an cable line, extracts EPG data from the UI-related data and then stores the extracted EPG data in the data base memory 80 with a predetermined format under the control of the control part 90.

The UI display part 60a under the control of the control part 90, produces an EPG guide bar having a fixed indicator for displaying the present time cooperating with the graphic processor 60b using data for displaying EPG and a record-proceeding extent. In the mean time, the control part 90 records a broadcast program corresponding to the predetermined time using the fixed indicator as a reference. In this case, the UI display part 60a displays a record-proceeding status on the areas in the EPG guide bar corresponding to the broadcast program which is being recorded by taking the present time as a reference or other broadcast programs with the help of the graphic processor 60b.

Here, the present invention is characterized in that the fixed indicator representing the present time displayed on the guide bar is fixed to the same location without varying in accordance with a time flow. And, the record-proceeding status(es) of the broadcast program(s) is(are) represented by a shaded technique in a manner that the record-proceeding status(es) is(are) distinguished from the area(s) of the program(s) sliding on the guide bar in color.

Moreover, the recording process is, for example, carried out for one hour or two so as to be stored in a program memory 100. After the scheduled record time elapses, the previously-recorded broadcast program(s) is(are) erased by a control of the control part 90 and the presently broadcasted program is recorded therein. Such a process is repeated continuously as long as power of the TV set is turned on.

Meanwhile, the OSD part 70 processes the display information outputted from the UI display part 60a as an OSD form and then provides the monitor with the processed information. The monitor 40 displays the EPG guide bar having the fixed indicator like the OSD form, the EPG data sliding within the guide bar corresponding to the present time, and the record-proceeding status of at least one broadcast program which is being recorded by taking the present time as a reference on the screen thereof.

The data base memory 80 stores the EPG data from the EPG decoder 50 therein in accordance with the control of the control part 90. The program memory 100 is updated for a predetermined time corresponding to the present time to store the broadcast programs updated every predetermined time interval therein. And, the UI display part 60a is provided with data for an EPG display, data for a record-proceeding extent, and other necessary data in accordance with the control of the control part 90.

The control part 90, as explained previously, controls the entire components 10 to 80 so as to perform the EPG display process.

In the EPG guide bar, areas of the past, present, and future broadcast programs slides from the right end of the guide bar to the left end in accordance of a time flow using the present time as a reference. In each of the areas, a title of the corresponding program is displayed. And, the present record-proceeding status is displayed on the program areas regardless of the boundaries of the respective program areas with a shaded color different from the guide bar. Such a shaded part informs the viewer of an interval enabling the broadcast program, which is on the air as well as is being recorded, to be shifted back to the past.

The fixed indicator and EPG guide bar may be displayed on the screen of the monitor 40 temporarily or continuously during the EPG display process by a viewer's selection.

A function of the UI display part 60a is explained in detail as follows. When the extracted EPG data are stored in the data base memory 80, the UI display part 60a carries out various data processing with the graphic processor 60b using the EPG data in accordance with a viewer's command.

For instance, the UI display part 60a may carry out the data processing to display the entire EPG data on the screen of the monitor 40. For another instance, the UI display part 60a enables to display the guide bar, the broadcast program areas having the corresponding titles in the guide bar as slides, and the recording statuses of the broadcast programs recorded with a predetermined time interval by taking the present time as a reference on the sliding areas of the broadcast programs.

Figure 3:
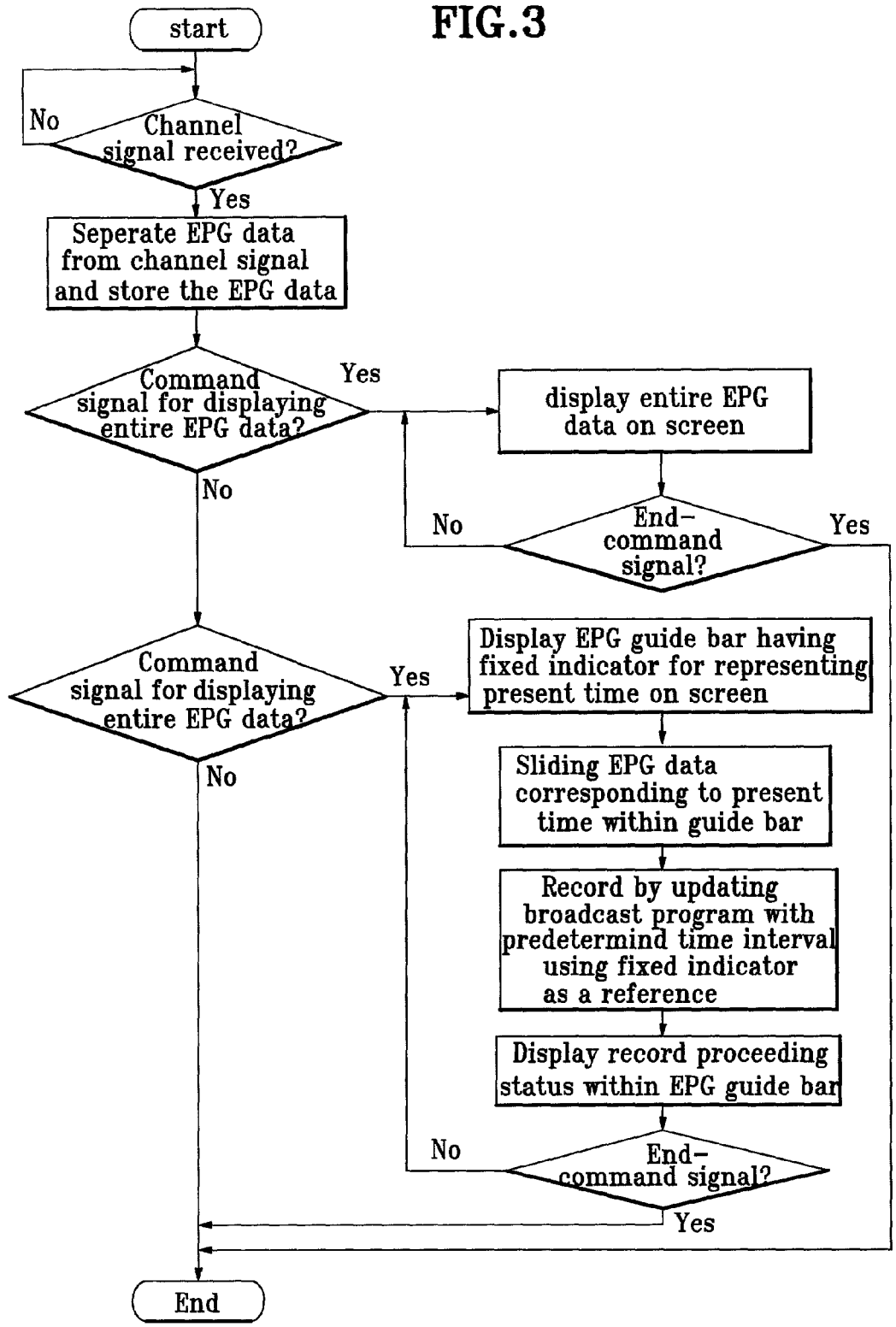
FIG. 3 illustrates a flowchart of an embodiment of a system program according to an apparatus in FIG. 2.

FIG. 3 illustrates a flowchart of an embodiment of a system program according to an apparatus in FIG. 2. The flowchart shown in FIG. 3 is merely exemplary and is not to be construed as limiting the present invention. The present teachings can be readily applied to other types of apparatuses and methods thereof. Referring to FIG. 3, the control part 90 checks whether signals are received from channels such as a terrestrial wave, a cable, a modem, an exclusive line and the like. When a channel signal is received from one of the channels, EPG data are separated from the received channel signal and then the separated EPG data are stored in the memory 80. It is then checked whether signals for the entire EPG display are received by a viewer's selection. When such a command signal exists, the control part 90 displays the entire EPG data on the screen of the monitor 40. Subsequently, the control part 90 checks whether there is an end-command signal instructed by the viewer. If the end-command signal exists, the control part 90 terminates to display the entire EPG data.

Figure 4:
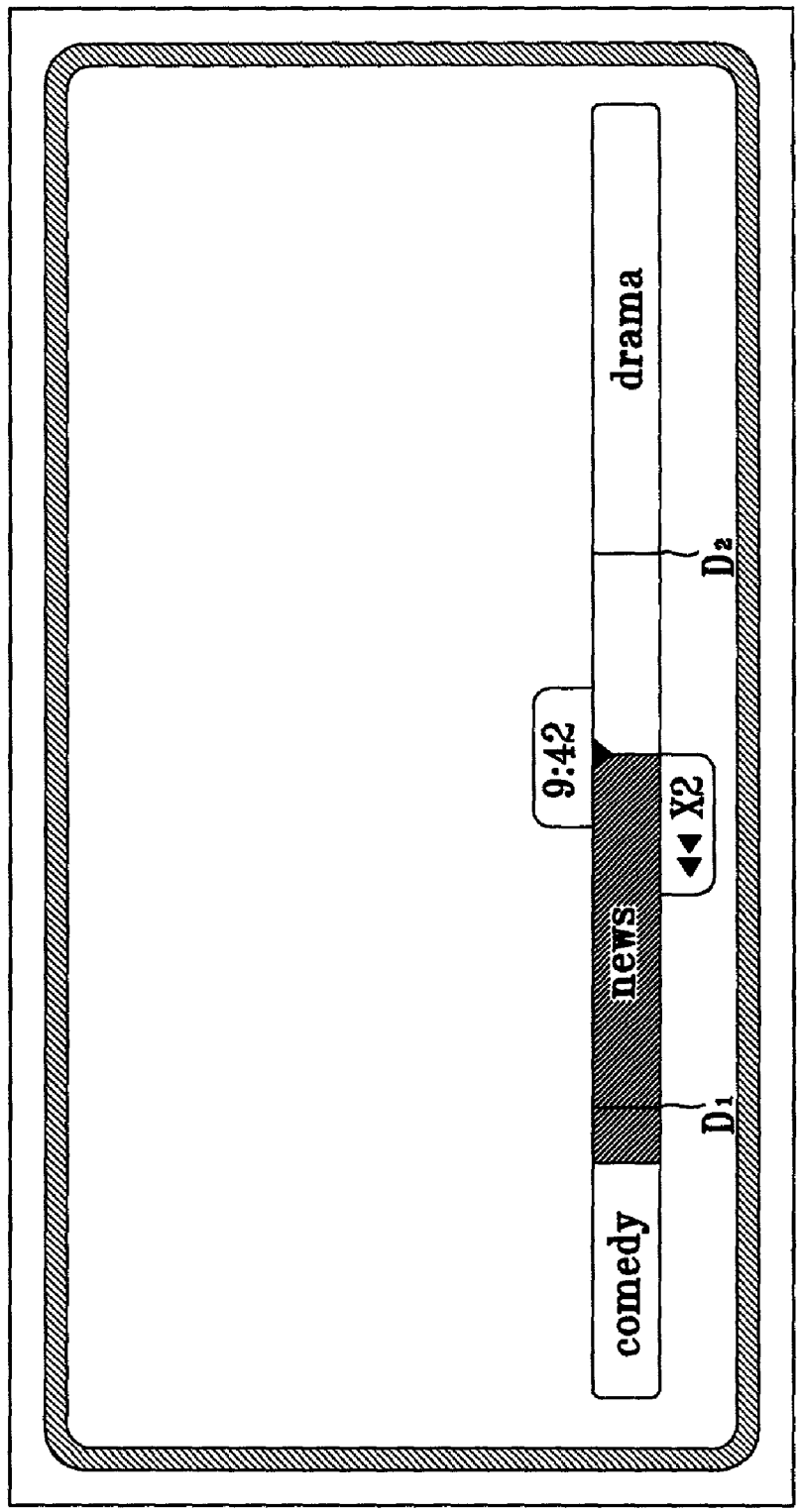
FIG. 4 illustrates a display status of an EPG guide bar according to the present invention.

If the command signal for displaying the entire data is not inputted thereto, the control part 90 checks whether a command signal for displaying an EPG record status is inputted thereto. If such a command signal is inputted, a frame type EPG guide bar corresponding to the absolute time is firstly displayed on the screen of the monitor 40 as well as the fixed indicator representing the present time is displayed at a middle part of the bar. Namely, when the power of the TV set is turned on and the viewer provides the command signal for displaying the EPG record status, as shown in FIG. 4, the broadcast programs corresponding to a predetermined channel are displayed on the screen. The title areas of the broadcast programs then enter the EPG guide bar from the right end in broadcast order so as to move to the left end of the status window. In this case, each of the title areas of the broadcast programs has a length proportional to the time length of the corresponding program.

FIG. 4 illustrates a display status of an EPG guide bar according to the present invention.

Referring to FIG. 4, the moment the title area of the broadcast program entering the EPG guide bar from right end passes through the fixed indicator, the broadcast program is recorded as well as stored in the program memory 100 of the TV set. A shaded part shown in FIG. 4 represents the storage extent of the broadcast program stored in the program memory 100. In the present embodiment, it is assumed that the maximum record extent amounts to one hour and that the storage capacity of the memory 100 is one hour as well. Besides, such a storage capacity may be modified variously in accordance with the design rule of the product company. For instance, when a title area of an A broadcast program passes through the fixed indicator, the A broadcast program starts to be displayed on the monitor(or a screen of a TV set) 40 on real-time as well as the contents of the broadcast program start to be stored in the memory 100 on real-time. Subsequently, if the length of the A broadcast program is at lest one hour, a front end of the A broadcast program stored previously in the memory starts to be erased from the corresponding area of the memory 100 and then the rest contents after the front end to the end point of the A broadcast program will be stored in the memory 100 the moment one hour elapses. Thereafter, when a title area of a B broadcast program passes through the indication needle and the contents start to be displayed on the screen, the contents of the A broadcast program stored in the memory are erased from the memory in order of being previously stored in the memory after the front end. Then, an introduction part of the B broadcast program is stored in the erased part of the memory 100 from the end part of the A broadcast program amounting to the erased area. Such a procedure is carried out continuously while the viewer watches the TV set. When the fixed indicator indicates AM 9:42 at the moment, as shown in FIG. 4, a news program(not shown in the drawing) which is being broadcasted is displayed on the present screen. In the front part of the memory 100, a comedy program as the previous broadcast program has been stored in part. Thus, continued to the previous comedy program, the news program on the air is stored thereafter. In this case, when an end point D2 of the news program passes through the fixed indicator, a front part of the news program starts to be erased from the memory 100 as soon as a front part of a following drama program is stored in the memory 100 as continued from the end point part of the news program.

In other words, as shown in FIG. 4, the viewer(or viewer) enables to recognize the title and broadcast proceeding extent of the presently-broadcast program as well as other titles corresponding to the previous and following broadcast programs. In FIG. 4, the EPG guide bar is displayed at a lower part of the screen, which is optional so as to be displayed at another part of the screen by the designer's choice.

Moreover, considering the program on the air, the viewer enables to recognize the proceeding extent and recorded amount of the presently-broadcast program by taking the present time indicated by the fixed indicator as a reference with the lapse of time. Therefore, the viewer plays the program contents of the previously-recorded amount so as to watch the played part on the screen. While the viewer watches the played part, as mentioned in the above explanation, the rest part of the previously-broadcast program is also stored in the memory 100 continuously. Thus, the viewer enables to watch the entire program, which is being broadcasted presently, without missing parts.

As mentioned in the foregoing description, the present invention is characterized in that the fixed indicator indicating the present time on the guide bar is fixed to a predetermined portion(ex. the central part of the bar in the present embodiment). In other words, while the fixed indicator designating the present time is fixed to one location, a title area of the presently-broadcast program moves toward the fixed indicator and the status that the previous part of the presently-broadcast program is being recorded is displayed through the EPG guide bar. Thus, it is unnecessary to produce the guide bar having been displayed on the screen again. Moreover, in the present invention, the program title is written and the program title area having a length proportional to the program length moves on real-time. Thus, the viewer enables recognize the previous, present, and following programs exactly by taking the present time as a reference.

Then, the control part 7 terminates the above procedures once an end command signal is inputted to the control part 90 by a viewer's selection.

Accordingly, the present invention provides the advantages or effects as follows.

First, as the areas of the broadcast program titles slide onward centering around the fixed indicator, the viewer enables to recognize the title and broadcast proceeding extent of the presently-broadcast program as well as other titles corresponding to the previous and following broadcast programs.

Second, considering the presently-broadcast program, the viewer enables to be informed of the proceeding(running) extent and amount of the recorded amount of the presently-broadcast program by taking the present time represented by the fixed indicator as a reference with the elapse of time. Namely, the viewer enables to attain information how far the proceeding location of the viewer-demanding broadcast program will be shifted back to the previous temporal location. Therefore, the viewer enables to play the viewer-demanding part of the broadcast program within the checked time shift interval without missing parts as well as further watch the played part through the screen.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for displaying a program guide bar, comprising:
   a channel demodulation part configured to demodulate a received broadcast signal;
   a transport part configured to divide the broadcast signal outputted from the channel demodulation part into data related to program schedule information and a plurality of broadcast programs;
   a memory configured to store the divided broadcast programs;
   a decoder configured to extract the program schedule data from the data related to the program schedule information;
   a user interface display part configured to produce information for sliding additional information areas of the broadcast programs, the additional information areas being included in a guide bar having a fixed indicator that is fixed without varying with time, corresponding to the program schedule data and entering the guide bar from a right end in broadcast order so as to slide to a left end;
   a control part configured to record a broadcast program when an additional information area of the broadcast program passes through the fixed indicator; and
   an on-screen display part configured to convert the information input from the user interface display part into an on-screen display form,
   wherein the fixed indicator has a visual representation to display the present time at the moment of displaying on the fixed indicator and a length of a part of the guide bar located to a left of the fixed indicator is proportional to a capacity of the memory.

2. The apparatus of claim 1, wherein each length of the additional information areas of the broadcast programs is proportional to a broadcast length of a real broadcast program.

3. The apparatus of claim 1, wherein the guide bar is displayed at a lower part of the screen.

4. A method of displaying a program guide bar, comprising the steps of:
   demodulating a received broadcast signal;
   dividing the broadcast signal into data related to program schedule information and a plurality of broadcast programs;
   detecting program schedule data from the data related to the program schedule information;
   producing information for sliding additional information areas of the divided broadcast programs, the additional information areas being included in a guide bar having a fixed indicator that is fixed without varying with time, corresponding to the program schedule data and entering the guide bar from a right end in broadcast order so as to slide to a left end;
   recording a broadcast program when an additional information area of the broadcast program passes through the fixed indicator; and
   displaying with sliding the additional information areas of the broadcast programs,
   wherein the fixed indicator has a visual representation to display the present time at the moment of displaying on the fixed indicator and a length of a part of the guide bar located to a left of the fixed indicator is proportional to a capacity of a memory.

5. The method of claim 4, wherein the additional information areas of the broadcast programs slide from a right end of the guide bar through the fixed indicator to a left end of the guide bar, when a viewer watches the broadcast program in the order of play of the broadcast program.

6. The method of claim 4, wherein the additional information areas are displayed in a manner that a part displaying a recorded amount of the memory is distinguishable as a part displaying an empty part of the memory.

7. The apparatus of claim 1, wherein the additional information areas slide with a constant time interval so as to represent the extent of storing the broadcast program.

8. The apparatus of claim 1, wherein the additional information area includes a title area of the broadcast program.

9. The method of claim 4, wherein the channel signal is inputted via one of a terrestrial wave, a cable line, a telephone modem line and a satellite.

10. The apparatus of claim 1, wherein the guide bar and the fixed indicator are temporarily displayed.

11. The apparatus of claim 1, wherein the fixed indicator is automatically displayed according to a viewer's selection or change of contents of the broadcast program.

12. An apparatus for displaying a program guide bar, the apparatus comprising:
   a channel demodulation part configured to demodulate received broadcast signals;
   a transport part configured to divide the broadcast signals into data related to program schedule information and a plurality of broadcast programs;
   a memory configured to store at least one of the divided programs;
   a decoder configured to extract program schedule data from the data related to the program schedule information;
   a user interface display part configured to display a fixed indicator separating each storage extent for the stored programs and a remaining extent of the memory on the program guide bar at a current time, and the program schedule data for each stored program from the decoder; and
   an on screen display part configured to convert the fixed indicator and the program schedule data into an on-screen display form,
   wherein the fixed indicator is fixed without varying with time, the program guide bar slides by the fixed indicator so as to simultaneously represent an instant storage extent for a current broadcast program being stored currently, a preserved storage extent for each program having already been stored, and one of the broadcast programs being currently demodulated, and
   wherein the fixed indicator has a visual representation to display the current time at a moment of displaying on the fixed indicator and a length of a part of the guide bar located to a left of the fixed indicator is proportional to a capacity of the memory.

13. An apparatus for displaying a program guide bar, the apparatus comprising:
   a channel demodulation part configured to demodulate received broadcast signals;
   a transport part configured to divide the broadcast signals into data related to program schedule information and a plurality of broadcast programs;
   a memory configured to store of the divided programs;
   a user interface display part configured to display a fixed indicator separating each storage extent for the stored programs and a remaining extent of the memory on the program guide bar at a current time; and
   an on screen display part configured to convert the fixed indicator and the storage extents into an on-screen display form,
   wherein the fixed indicator is fixed without varying with time, the program guide bar slides by the fixed indicator so as to simultaneously represent an instant recorded extent for a current broadcast program being currently demodulated from the received broadcast signals and a preserved storage extent for each program having already been stored,
   wherein the fixed indicator has a visual representation to display the current time at a moment of displaying on the fixed indicator and a length of a part of the guide bar located to a left of the fixed indicator is proportional to a capacity of the memory.

14. A method of displaying a program guide bar, comprising the steps of:
   demodulating received broadcast signals;
   dividing the broadcast signals into data related to program schedule information and a plurality of broadcast programs;
   storing the divided programs;
   extracting a program schedule data from the broadcast signals; and
   displaying a fixed indicator separating each storage extent for the stored programs and a remaining extent of a memory on the program guide bar at a current time, and the program schedule data for each stored program,
   wherein the fixed indicator is fixed without varying with time, the program guide bar slides by the fixed indicator so as to simultaneously represent an instant storage extent for a current broadcast program being stored currently, and one of the broadcast programs being currently demodulated from the received broadcast signals,
   wherein the fixed indicator has a visual representation to display the current time at a moment of displaying on the fixed indicator and a length of a part of the guide bar located to a left of the fixed indicator is proportional to a capacity of the memory.

15. A method of displaying a program guide bar, comprising the steps of:
   demodulating received broadcast signals;
   dividing the broadcast signals into data related to program schedule information and a plurality of broadcast programs;
   storing the divided programs; and
   displaying a fixed indicator separating each storage extent for the stored programs and a remaining extent of a memory on the program guide bar at a current time,
   wherein the fixed indicator is fixed without varying with time, the program guide bar slides by the fixed indicator so as to simultaneously represent an instant storage extent for current broadcast a program being stored currently, one of the broadcast programs being currently demodulated from the received broadcast signals, and a current time, and
   wherein the fixed indicator has a visual representation to display a current time at a moment of displaying on the fixed indicator and a length of a part of the guide bar located to a left of the fixed indicator is proportional to a capacity of the memory.

16. The apparatus of claim 1, wherein the user interface display part displays simultaneously on the fixed indicator, a recorded amount of a current broadcast program being recorded currently, a recorded amount of a previous broadcast program recorded in the memory prior to the current broadcast program and titles of the current broadcast program and the previous broadcast program.

17. The method of claim 4, wherein a recorded amount of a current broadcast program being recorded currently, a recorded amount of a previous broadcast program recorded in the memory prior to the current broadcast program and titles of the current broadcast program and the previous broadcast program are simultaneously displayed on the fixed indicator.

18. The apparatus of claim 12, wherein the user interface display part displays simultaneously on the fixed indicator, the instant storage extent of the current broadcast program, a storage extent of a previous broadcast program stored in the memory prior to the current broadcast program and titles of the current broadcast program and the previous broadcast program.

19. The apparatus of claim 13, wherein the user interface display part displays simultaneously on the fixed indicator, the instant recorded extent of the current broadcast program, a recorded extent of a previous broadcast program stored in the memory prior to the current broadcast program and titles of the current broadcast program and the previous broadcast program.

20. The method of claim 14, wherein the instant storage extent of the current broadcast program, a storage extent of a previous broadcast program stored in the memory prior to the current broadcast program and titles of the current broadcast program and the previous broadcast program are simultaneously displayed on the fixed indicator.

21. The method of claim 15, wherein the instant storage extent of the current broadcast program, a storage extent of a previous broadcast program stored in the memory prior to the current broadcast program and titles of the current broadcast program and the previous broadcast program are simultaneously displayed on the fixed indicator.

22. The apparatus of claim 1, wherein the additional information areas are displayed in a manner that a part displaying an amount recorded in the memory is distinguishable as a part displaying an amount not recorded in the memory.

* * * * *